L. E. WATERMAN.
CULTIVATOR FRAME.
APPLICATION FILED FEB. 3, 1912.
1,025,770.
Patented May 7, 1912.
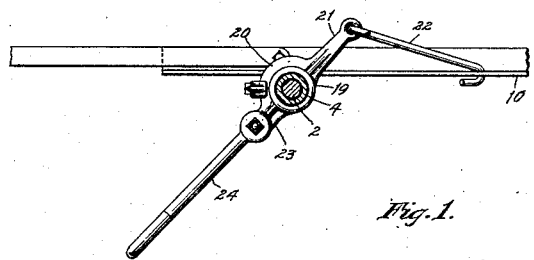
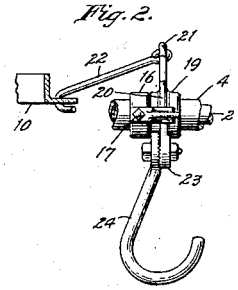
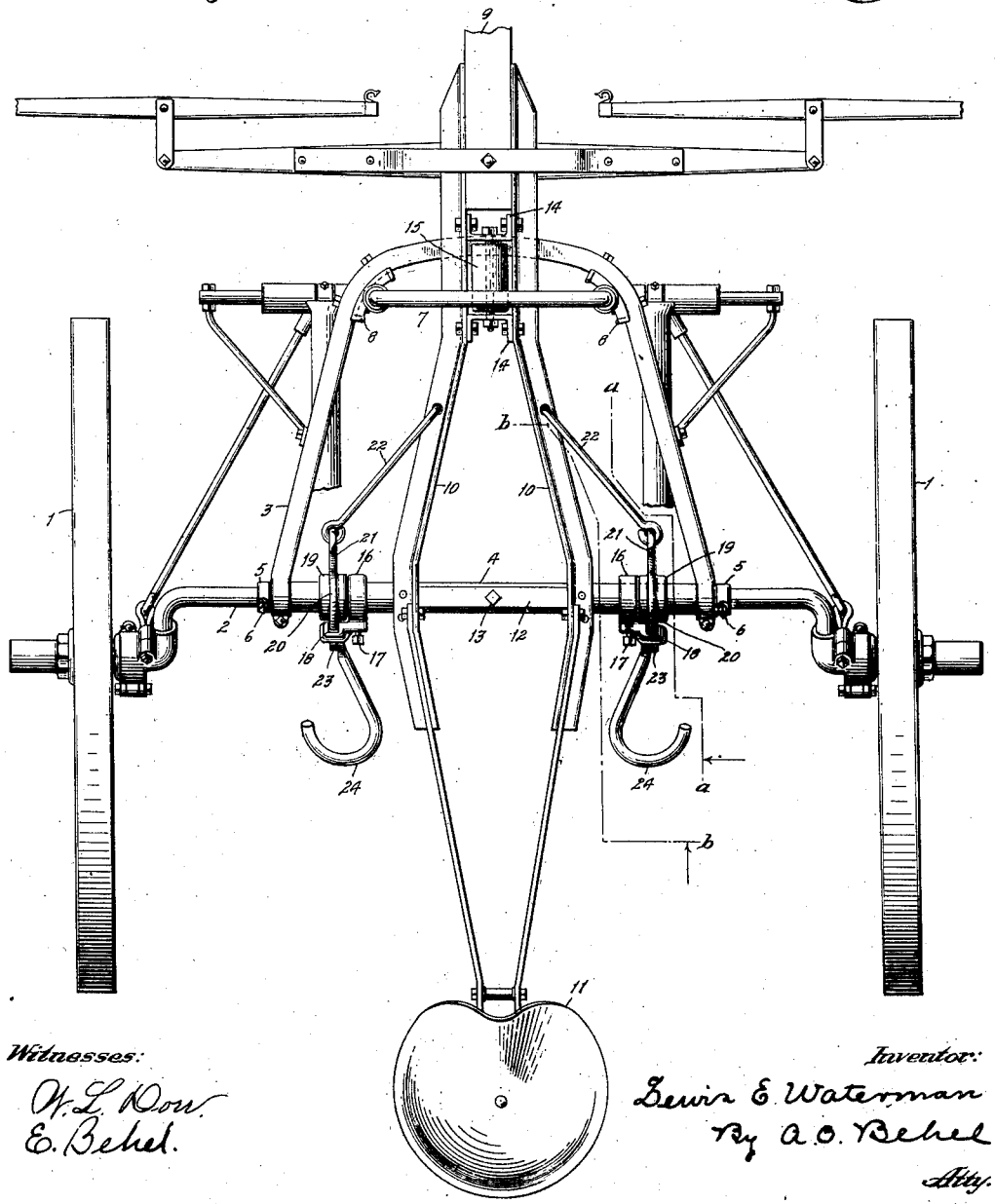
Witnesses:
W. L. Dow
E. Behel
Inventor:
Lewis E. Waterman
By A. O. Behel
Atty.

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

CULTIVATOR-FRAME.

1,025,770.

Specification of Letters Patent.

Patented May 7, 1912.

Application filed February 3, 1912. Serial No. 675,386.

*To all whom it may concern:*

Be it known that I, LEWIS E. WATERMAN, a citizen of the United States, residing at Rockford, in the county of Winnebago and State of Illinois, have invented certain new and useful Improvements in Cultivator-Frames, of which the following is a specification.

The object of this invention is to pivot the axle centrally of the main frame, and foot levers for moving the axle on its pivot.

In the accompanying drawings, Figure 1 is a plan view of cultivator. Fig. 2 is a section on line $b\ b$, Fig. 1. Fig. 3 is a section on line $a\ a$, Fig. 1.

In the drawings I have only shown so much of a cultivator necessary to an understanding of my improvements.

The wheels 1 support the axle 2 which is in crank form. A frame 3 is in U shape having its ends clamped to a sleeve 4 surrounding the axle. This sleeve is held against movement lengthwise of the axle by the collars 5 connected to the axle by the set-screws 6. To the forward portion of the frame is secured a bail 7 by the brackets 8. To the horizontal ends of the bail may be connected the shovel supporting beams in any suitable manner.

A tongue 9 is located forward of the frame 3 and has seat supporting bars 10 bolted to it which extend rearward and are located on the sleeve 4. A seat 11 is connected to the seat supporting bars 10. A cross-bar 12 is connected to the seat supporting-bars and overlies the sleeve 4. A bolt 13 passes through the cross-bar, sleeve and axle, thereby forming a pivotal connection between the seat supporting-bars and the axle.

Angle irons 14 connect the seat supporting-bars, and a roller 15 is supported by the angle irons. This roller is located beneath the bail 7 and receives the weight of the frame forward of the axle. To the sleeve 4 are connected two collars 16 by the set-screws 17. Each collar has a concentric groove 18. Around the sleeve are loosely located two collars 19, each provided with a concentric projection 20 which enters the concentric groove 18 thereby holding it against bodily movement along the sleeve, but permitting it to oscillate thereon.

An ear 21 extends upward from each of the collars 19 to which a rod 22 is pivotally connected, the other end of the rod is pivotally connected to one of the seat supporting-bars 10. From each of the collars 19 depends a projection 23 to which is adjustably connected a foot-lever 24.

By moving one of the foot levers forward the axle carrying the frame and the bail will be rocked on the pivotal bolt 13 in one direction and by moving the other foot-lever forward these parts will be moved in the opposite direction.

This cultivator is of the type known as dogger cultivator that is, one in which the shovel supporting beams have no swinging movement transverse to the line of draft independently of one another but have such movement as the frame to which the beams are connected is oscillated.

I claim as my invention.

A cultivator comprising an axle, wheels supporting the axle, a frame adapted to support the shovel supporting beams, a seat support having a pivotal connection with the axle and a roller engagement with the frame, and foot levers pivotally supported by the axle and having a linked connection with the seat support.

In testimony whereof I have hereunto set my hand in presence of two subscribing witnesses.

LEWIS E. WATERMAN.

Witnesses:
A. O. BEHEL,
E. D. E. N. BEHEL.

Copies of this patent may be obtained for five cents each, by addressing the "Commissioner of Patents, Washington, D. C."